United States Patent [19]

Karlowsky

[11] Patent Number: 4,613,275

[45] Date of Patent: Sep. 23, 1986

[54] AUGER ARRANGEMENT FOR UNLOADING A TRUCK BOX

[76] Inventor: Ernest W. Karlowsky, 600 Kilkenny Drive, Winnipeg, Manitoba, Canada, R3T 3E1

[21] Appl. No.: 693,648

[22] Filed: Jan. 22, 1985

[51] Int. Cl.$^4$ ............................................. B60P 1/40
[52] U.S. Cl. .................................... 414/489; 414/491;
414/523; 414/526; 414/505; 414/326; 198/632;
198/861.4
[58] Field of Search ............... 414/489, 491, 507, 523,
414/526, 319, 320, 318, 326, 504, 505, 503;
248/278; 198/632, 313, 317, 318, 861.4

[56] References Cited

U.S. PATENT DOCUMENTS

| | | | |
|---|---|---|---|
| 2,613,004 | 10/1952 | Kane | 414/523 X |
| 2,981,400 | 4/1961 | Rohweder | 198/632 X |
| 3,021,025 | 2/1962 | Sudenga et al. | 414/505 |
| 3,642,155 | 2/1972 | Carlson | 198/313 X |
| 3,670,913 | 6/1972 | Reaves | 414/523 X |
| 3,717,272 | 2/1973 | Chartier et al. | 414/256 X |
| 3,719,268 | 3/1973 | Koehnen | 198/632 |
| 3,742,209 | 6/1973 | Williams | 248/278 X |
| 4,119,223 | 10/1978 | Fiechter | 198/318 X |
| 4,183,489 | 1/1980 | Copher et al. | 248/278 |
| 4,368,003 | 1/1983 | MacDonald | 414/523 |

FOREIGN PATENT DOCUMENTS 2469864 6/1981 France .................. 198/632

Primary Examiner—Frank E. Werner
Attorney, Agent, or Firm—Stanley G. Ade; Adrian D. Battison

[57] ABSTRACT

An auger support arrangement for attachment to a sidewall of a truck box enables the auger to be moved from a storage position alongside the sidewall to an operating position parallel to the tailgate and cooperating with an aperture in the tailgate. A separate hopper can be permanently attached to the tailgate with the auger having a flight which engages a drive coupling of polygonal shape of a drive motor attached to the hopper. The support includes an arm pivotally mounted on the sidewall with a swivel coupling on the free end of the arm. The arm allows the swivel to move from a position midway along the sidewall and at a mid height of the sidewall to a position at the top rear corner of the sidewall.

9 Claims, 5 Drawing Figures

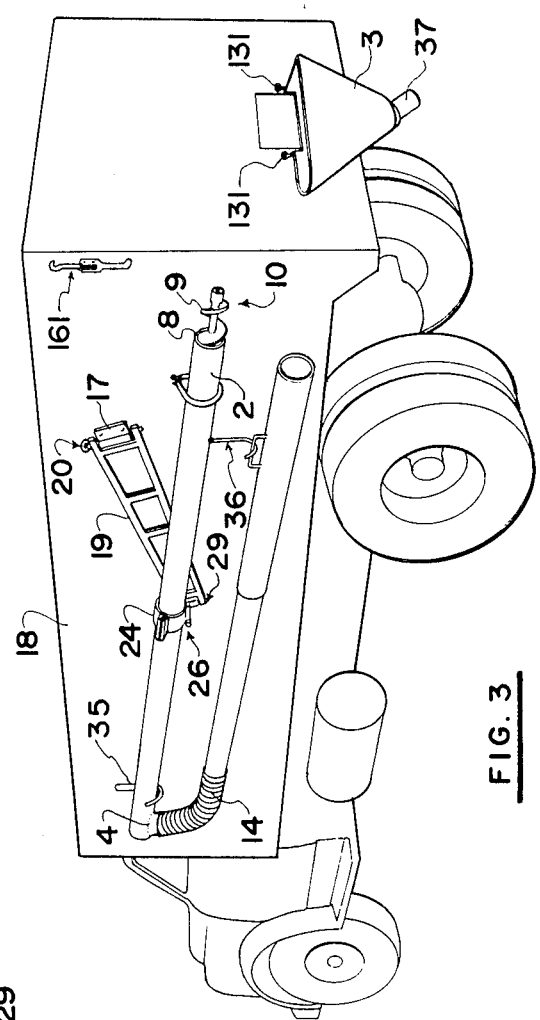
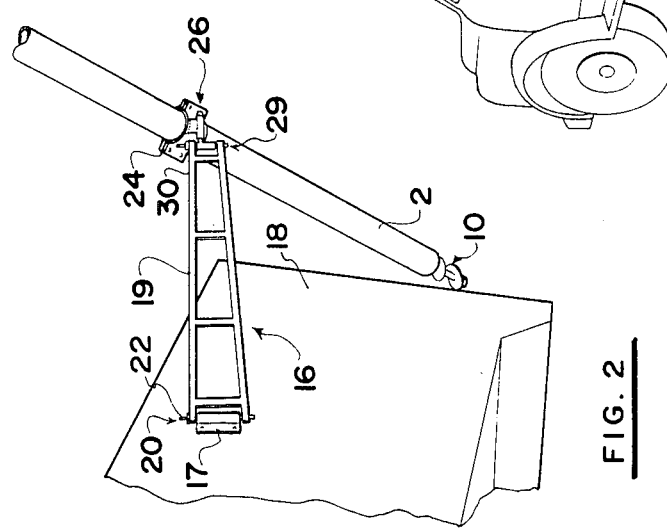
FIG. 3
FIG. 2

AUGER ARRANGEMENT FOR UNLOADING A TRUCK BOX

BACKGROUND OF THE INVENTION

The present invention relates to an auger arrangement for unloading a truck box of the type which has side walls and a rear wall or tailgate toward which the box is suitable for discharge through an aperture.

Material unloader apparatus of various sorts is, of course, well known as exemplified by apparatus disclosed in U.S. Pat. No. 3,717,272. The unloader apparatus disclosed in U.S. Pat. No. 3,717,272 includes an auger conveyor which is disposed for elevating material flowing by gravity from an aperture in a tailgate of a material carrying box mounted on a truck vehicle. The inventors of the above prior art have recognized the need for providing means of storing the auger conveyor as may be noted by the fact that they have provided a hinge in the length of the auger conveyor for collapsing the upper portion thereof into the material carrying box. The folding of the auger conveyor at the hinge is beneficial as it allows the vehicle to be driven in places where it could not otherwise be driven without damage being done to the auger conveyor. For instance, the auger conveyor could conceivably be caught on overhanging tree branches or other obstacles if the auger conveyor were left in an extended position.

The apparatus disclosed in U.S. Pat. No. 3,717,272 has a difficulty, however, in that it is often necessary that an operator should climb into the material carrying box, wade into the material, and lift the upper portion of the auger conveyor to an upright position while standing with feet sunk in material in the material carrying box.

The use of apparatus as disclosed in U.S. Pat. No. 3,717,272 also makes difficult the use of a tarpaulin for covering a load in the material carrying box. If the auger conveyor is folded onto the tarpaulin it is apt to be ripped. On the other hand, if the tarpaulin is placed over the folded auger conveyor, the tarpaulin must be removed each time that the auger conveyor is to be used.

SUMMARY OF THE INVENTION

Accordingly, it is an object of the present invention to provide an auger support arrangement and an auger arrangement for use in such an apparatus which obviate and mitigate from the difficulties and disadvantages of the prior art.

According to the present invention there is provided a support arrangement for an auger tube for use in unloading a truck of the type having an elongate tiltable material carrying box with sidewalls and a discharge aperture in a rear wall of said box, said box being tiltable toward the rear wall for discharging material, the support arrangement being arranged to move said auger tube from an operating position in which a feed end thereof cooperates with said discharge aperture to a storage position and comprising attachment means for engaging and supporting said auger tube, support means for said attachment means, means for mounting said support means on a sidewall of said truck and swivel means interconnecting said attachment means to said support means, said swivel means being arranged to provide pivotal movement of said auger tube about two axes and said mounting means being arranged to provide movement of said support means in a direction forwardly and rearwardly of said sidewall whereby said auger tube can be moved such that in said operating position said support means is arranged adjacent the rear edge of the sidewall with said auger tube lying in a plane substantially parallel to said rear wall and extending from said support means to said feed end and in said storage position said support means is moved forwardly from said rear edge such that said auger tube lies substantially wholly alongside said sidewall in a plane substantially parallel thereto.

According to a second aspect of the invention there is provided an auger arrangement for unloading a truck of the type having an elongate tiltable material covering box with sidewalls and a rear wall having a discharge aperture toward which said box is tiltable, said auger arrangement comprising an auger tube, an auger flight within the tube for rotation relative thereto, a hopper for attachment to the rear wall at said aperture, a motor mounted on said hopper for driving said auger flight, said auger flight being separable from said drive motor and said auger tube being separable from said hopper for storage of said auger tube separate from said hopper, said auger flight and said drive motor having cooperable coupling means whereby said tube can be inserted into said hopper and said flight engaged with said drive motor.

It is one advantage of the invention therefore that the feed end of the auger can be removed from the aperture after completion of a required discharge following which the support means can be moved and the auger tube pivoted so that the auger tube lies wholly alongside the truck box sidewall so that it can be supported in position on the sidewall without projecting out from the truck box in any direction. Furthermore this movement avoids any interference with the truck tarp and can be carried out simply by a single operative.

According to the second feature of the invention, the hopper is separate from the auger tube and therefore can be left in position at the tailgate while the auger is moved to the storage position. In this case the hopper includes a drive motor which is permanently attached to the hopper and movable therewith and which carries a drive coupling for engaging a cooperating couple in an end of the flight of the auger tube. Thus the auger tube can be moved into position in the hopper and engaged onto the drive coupling. The tube and flight therefore can be free from any hydraulic lines or drive couplings since the drive power for the flight is permanently coupled to the hopper.

Preferably the support means for the auger tube includes an arm which is pivotally mounted on the side of the truck box so that the end of the arm remote from the truck box moves in an arc from a position adjacent the top rear corner of the sidewall to a position forwardly of the rear edge and at a mid height of the sidewall so that the auger tube is stored at a manually suitable height on the sidewall.

DESCRIPTION OF THE DRAWINGS

The invention and advantages thereof will be more fully explained by reference to preferred embodiments described in relation to the drawings in which:

FIG. 2 is an isometric view of the material conveyor support of FIG. 1, disposed between a storage position and the operating position of FIG. 1.

FIG. 3 is an isometric view of the material conveyor support of FIG. 1, disposed in a storage position.

Individual elements illustrated in more than one drawing are indicated by like numerals on the drawings.

DETAILED DESCRIPTION OF PREFERRED EMBODIMENTS

Figure 1:
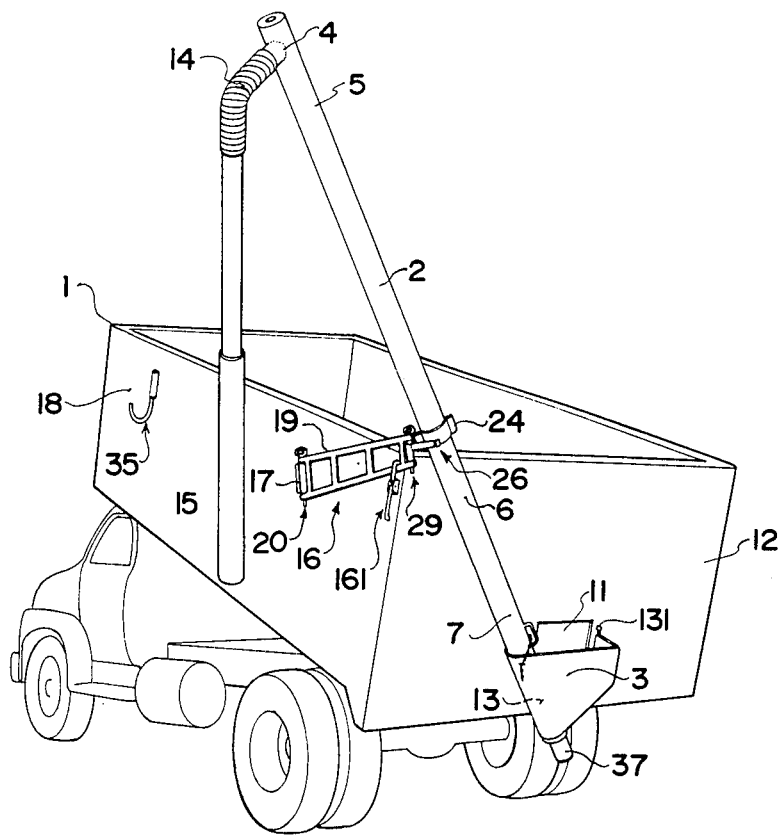
FIG. 1 is an isometric view of a material conveyor support, according to a preferred embodiment of the invention, attached upon a truck vehicle and supporting a grain auger disposed in an operating position.

As illustrated in FIG. 1, a material conveyor support, according to the present invention, is shown mounted on a truck vehicle having an elongate tiltable material carrying body such as a truck box 1.

Figure 5:
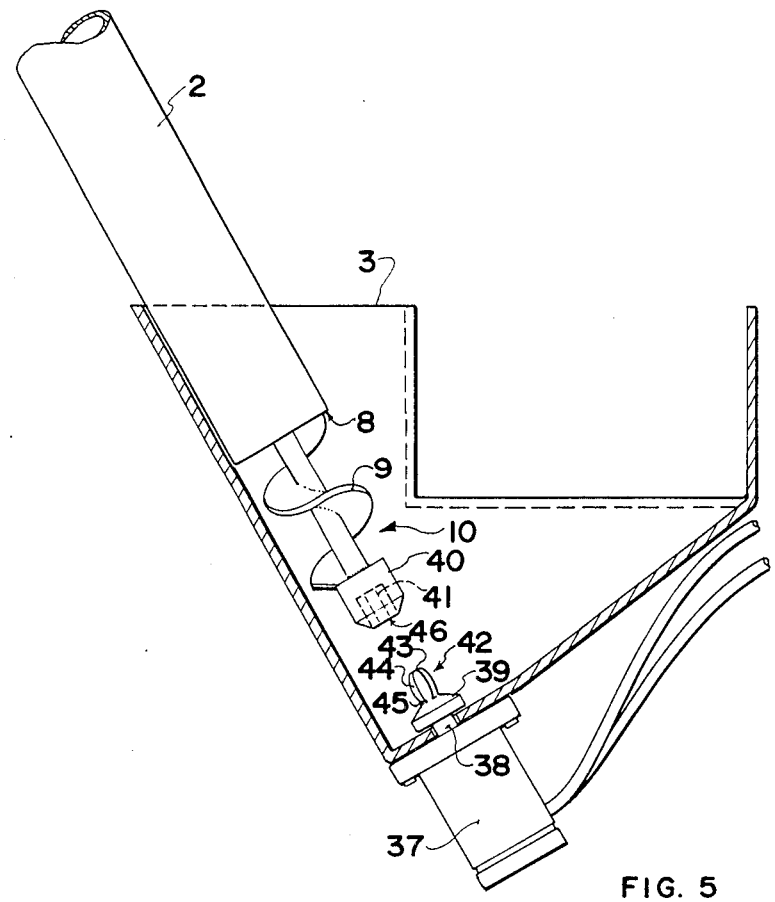
FIG. 5 is a cross-sectional view of the auger and hopper of FIG. 1 including a drive means for coupling with the lower end of the rotatable helical auger member.

An elongate material conveyor, such as auger conveyor 2, is provided for elevating material from a hopper 3 to a discharge end 4. The auger conveyor 2 has an upper end 5, a middle section 6 and a lower end 7 and comprises an auger conveyor tube 8 with a rotatable helical auger flight 9 therein as illustrated in FIG. 5. The lower end 7 of the auger conveyor 2 has a feed end 10 also illustrated in FIG. 5 which can be disposed in a feeding position in hopper 3 when auger conveyor 2 is placed in an operating position for elevating material as illustrated in FIG. 1.

The hopper 3 is removably attached adjacent an aperture 11 in tailgate 12 of truck box 1 to receive material therein from aperture 11. The size of the opening presented by aperture 11 can be adjusted by a slide (not shown) in a well known fashion. Material in truck box 1, such as seed grain, flows by gravity toward tailgate 12 and aperture 11 upon truck box 1 being tilted, as illustrated in FIG. 1 by well known hydraulic means (not shown). Material leaving tilted truck box 1 through aperture 11 drops down into hopper 3 and is received by feed end 10 of auger conveyor 2 when feed end 10 of auger conveyor 2 is in a feeding position. In this embodiment, the feeding position 13 of feed end 10 is along the lower inner surface of the left side of hopper 3 as shown in FIG. 1.

Auger conveyor 2 is supported upon a swingable flexible pipe 124 and an extensible pipe 15 in a well known fashion in order to adapt the material unloader apparatus for use in filling the seed boxes of agricultural seeding drills.

Auguer conveyor 2 is supported upon a swingable material conveyor support indicated at 16.

Figure 4:
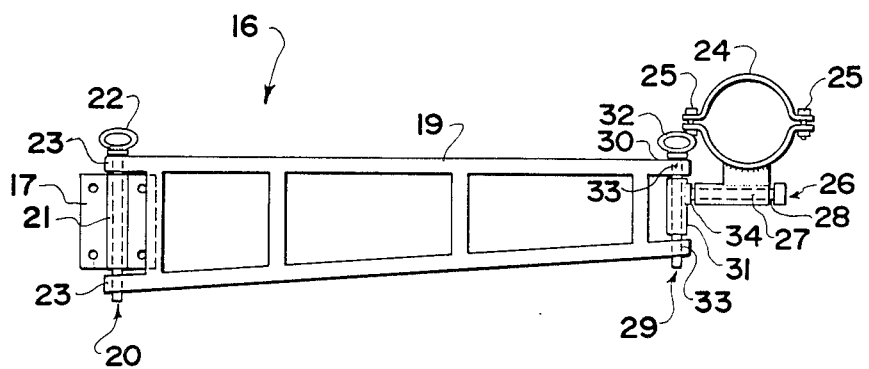
FIG. 4 is a side elevational view on an enlarged scale of the material conveyor support of Figure 1.

FIG. 4 illustrates the swingable material conveyor support 16 in more detail which is provided with a mounting plate 17 for attachment to the sidewall 18 of a truck box 1 (see FIG. 1). Mounting plate 17 can be attached to sidewall 18 by the use of bolts or other conventional fastening means. Swingable material conveyor support 16 also includes a pivot arm 19 swingable in an arc about a first hinge joint indicated at 20 and provided by a knuckle including sleeve 21 and a hinge pin 22 and a second knuckle provided by apertures 23 in pivot arm 19. A material conveyor attachment means comprising a clamp 24 for attaching to auger conveyor 2. Bolts 25 provide a means for clamping clamp 24 concentrically about auger conveyor tube 8. Clamp 24 is connected on a third hinge joint indicated at 26 and provided by a sleeve 27 mounted on a pin 28. A second hinge joint is indicated at 29 and is provided at the oppposite end 30 of pivot arm 19 from mounting plate 17 by a knuckle including sleeve 31, a hinge pin 32, and a second knuckle provided by apertures 33 in pivot arm 19. Pin 28 in this embodiment is bracketed in perpendicular fashion on the surface of sleeve 31 by a weld 34.

As indicated above, the first hinge joint indicated at 20 permits pivot arm 19 to swing in an arc about pin 22 relative to mounting plate 17. The mounting plate 17 is mounted on the sidewall 18 of truck box 1 so that pin 22 is inclined to the left relative to a vertical axis upon the tiltable truck box 12 in its normal horizontal position. Thus, when truck box 1 is tilted as in FIG. 1, the pin 22 moves toward the vertical so that the opposite end 30 of pivot arm 19 can be swung in a substantially horizontal arc.

The third hinge joint indicated at 26; the second hinge joint indicated at 29; and the bracket means provided by weld 34, taken together, provide a swivel supportably connecting clamp 24 with opposite end 30 of pivot arm 19.

The swingable material conveyor support 16 is used to support auger conveyor 2 during movement of auger conveyor 2 between a storage position along side the tiltable truck box 1 as illustrated in FIG. 3 and an operating position with feed end 10 of auger conveyor 2 in feeding position 13 in hopper 3 as illustrated in FIG. 1. In FIG. 2, with the truck box tilted for discharge, it should be noted that hinge pin 22 of first hinge joint 20 is aligned with axis vertical so that opposite end 30 of pivot arm 19 may be swung in a substantially horizontal arc relative to mounting plate 17. Because opposite end 30 of pivot arm 19 can be swung in a substantially horizontal arc, the person manipulating the auger conveyor 2 need only balance upper conveyor 2 on the third hinge joint indicated at 26 and the person manipulating auger 2 need not provide force for lifting the auger conveyor 2 at third hinge joint 26. It is noted that the force required to balance auger conveyor 2 on third hinge joint 26 is somewhat reduced because the normally downwardly directed portion 7 of auger conveyor 2 partially balances with the normally upwardly directed portion 5 of auger conveyor 2. It is noted that truck box 1 should be tiltable to an angle so that hinge pin 22 can in fact be aligned with axis vertical. By having pivot arm 19 swing in a substantially horizontal arc when truck box 1 is tilted, clamp 24 can be moved freely between a storage position half way up sidewall 18 of truck box 1 and at operating position above the end 12 of truck box 1.

Movement of auger conveyer 2 between the operating position illustrated in FIG. 1 in which the auger tube lies in a plane parallel to the tailgate and the storage position in illustrated in FIG. 3 in which the auger tube lies in a plane parallel to the sidewall, will now be described. The tilt of truck box 1 is preferably first adjusted so that hinge pin 22 is roughly aligned with axis vertical. Auger conveyor 2 is then freed from attachment in hopper 3 and feed end 10 of auger conveyor 2 is pulled axially out of hopper 3. As pulling force is applied, opposite end 30 of pivot arm 19 moves away from sidewall 18 of the truck box 1 in a substantially horizontal arc about first hinge joint 20. Simultaneously auger conveyor 2 is tilted about the third hinge joint 26 so that feed end 10 of auger conveyor 2 clears the upper edge of hopper 3. Auger conveyor 2 is then swung on second hinge joint 29 to align the longitudinal axis of auger conveyor 2 parallel with sidewall 18 of truck box 1. While maintaining auger conveyor 2 parallel with sidewall 18 of truck box 1, pivot arm 19 is pivoted on first hinge joint 20 in order to bring auger conveyor 2 to a storage position illustrated in FIG. 3 where auger conveyor 2 is fastened with conventional fastening means including a bracket 35 at the front end. The extension portion 15 can be looped onto a hook 36 carried suitably on the tube 8.

Auger conveyors, such as auger conveyor 2, have in recent years typically been driven by hydraulic orbit motors when the auger conveyors have been adapted for filling seed boxes on seeding drills. Conventional practice has been to have the hydraulic orbit motor connect with the rotatable helical auger member such as 9 at discharge end 4 of the auger conveyor 2. If such an arrangement is utilized in the unloader apparatus, according to the present invention, then hydraulic hoses must be run down auger conveyor 2 to clamp 24, from clamp 24 to mounting plate 17, and from mounting plate 17 to the rear of truck box 1 where the hoses can be connected to pipes mounted on the chassis of the truck. Such an installation requires a considerable amount of hydraulic hose.

It can therefore be advantageous to provide an unloader apparatus with means for driving the rotatable helical auger member 9 as illustrated in FIG. 5. A hydraulic orbit motor 37 is installed on hopper 3 with a drive shaft 38 protruding into the bottom of hopper 3. Drive shaft 38 is aligned substantially axially with the feeding position 13 of feed end 10 of auger conveyor 2. On drive shaft 38, there is provided a first coupling device 39. A second coupling device 40 is provided on the lower end of rotatable helical auger flight 9. Coupling devices 39 and 40 should be capable of acting together to transmit rotational torque from hydraulic orbit motor 37 to rotational helical auger member 9.

Coupling device 39 and 40 illustrated in FIG. 5 are particularly well adapted for the present application. Second coupling device 40 includes a socket or recess 41 with a cross-section in the shape of a sixsided regular polygon. First coupling device 39 includes a stud 42 having an outer end 43, a middle portion 44 and an inner end 45 disposed toward drive shaft 38. Middle portion 44 of stud 42 has a cross-section matching the cross-section of socket 41. However, stud 42 is tapered toward outer end 43 to facilitate ease of installation of socket 41 over stud 42. The fact that socket 41 has its opening 46 directed downwardly also reduces the chance of seed grain accumulating in socket 41. Stud 42 is also tapered from middle portion 44 to inner end 45. Thus, if auger conveyor 2 is aligned substantially, but less than precisely, axially of drive shaft 38, coupling devices 39 and 40 will continue to cooperate to provide rotational torque to rotatable helical auger member 9. While so coupled, socket 36 will swivel to a minor degree on middle portion 44 of stud 42 while transmitting rotational torque from stud 42. The six individual faces of stud 42 are each smoothly curved from middle portion 44 to outer end 43 and inner end 45.

Turning to FIG. 4 there is illustrated a preferred embodiment of a swingable material conveyor support 16. It should be noted that the swingable material conveyor support has two adjustment features to facilitate the installation of the swingable material conveyor support on truck boxes of different sizes. A first adjustment feature requires that pin 22 and 32 should be removed from hinges 20 and 29. Once pins 22 and 32 are removed pivot arm 19 is rotated a half turn about a longitudinal axis of said pivot arm so that apertures 23 exchange position relative to sleeve 21 and apertures 33 exchange position relative to sleeve 31. Pins 22 and 32 are then replaced in hinges 20 and 29 to reconnect the swingable material conveyor support. It will be apparent from examination of FIG. 4 that such a reconfiguration of swingable material conveyor support 16 provides for adjusting the height of the second hinge joint 29. A second measure for adjusting the height of third hinge 26 involves removing pin 32 from hinge 29, rotating sleeve 31 one-half turn by rotation of pin 28 in sleeve 27 and replacing pin 32 through apertures 33 and sleeve 31. Thus this second adjustment measure causes sleeve 31 to be inverted within hinge 29.

Upon consideration of the foregoing description it will be apparent that one of the main functions of pivot arm 19 in the above described preferred embodiment is to provide support for hinge 29 while permitting translational movement of the axis of hinge 29 between the position of hinge 29 illustrated in FIG. 1 and the position of hinge 29 illustrated in FIG. 3. Such a function could of course be provided by other mechanical means. For instance, hinge 29 could be mounted on a slide carriage being mounted on guides affixed on the side of a truck box to permit linear translational sliding of the slide carriage and hinge 29 between the position of hinge 29 illustrated in FIG. 1 and the position of hinge 29 illustrated in FIG. 3.

It will be noted from FIG. 1 that the hopper 3 is latched onto the tailgate by pins 131 which interlock cooperating flanges on the hopper and tailgate. In addition an overcentre latching device 161 is shown on the sidewall which can be manually actuated to clamp the lower edge of the arm 16 to the sidewall to assist in supporting the auger when filled and to prevent the arm moving away from the wall.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An auger arrangement for use in unloading a truck of the type having an elongate tiltable material carrying box with sidewalls and a discharge aperture in a rear wall of said box, said box being tiltable toward the rear wall for discharging material, said auger arrangement comprising an auger tube having a feed end at one end and a discharge duct at an opposed end and being continuous and unseparable therebetween, an auger flight within the tube for rotation relative thereto, a hopper for attachment to the rear wall at said aperture, a motor mounted on said hopper for driving said auger flight when said auger flight is in an operating position, said auger flight being separable from said drive motor and said auger tube being separable from said hopper for movement of said auger tube to a storage position separate from said hopper, said auger flight and said drive motor having cooperable coupling means at the bottom of and within the hopper whereby said tube can be inserted into said hopper and said flight engines with said drive motor, and a support arrangement arranged to move said auger tube from said operating position to said storage position and comprising attachment means for engaging and supporting said auger tube, support means for said attachment means, means for mounting said support means on a sidewall of said truck and swivel means interconnecting said attachment means to said support means, said swivel means being arranged to provide pivotal movement of said auger tube about two axes and said mounting means being arranged to provide pivotal movement of said support means in a direction forwardly and rearwardly of said sidewall whereby said auger tube can be moved such that in said operating position said support means is arranged adjacent the rear edge of the sidewall with said auger tube lying in a plane substantially parallel to said rear wall and extending from said support means to said feed end and in said storage position said support means is moved forwardly from said rear edge such that said auger tube lies substantially wholly along side said sidewall in a plane substantially parallel thereto.

2. The arrangement according to claim 1 wherein the mounting means is arranged to move said support means forwardly and downwardly.

3. The arrangement according to claim 2 wherein the mounting means is arranged such that in said operating position said support means is arranged adjacent a rear upper corner of the sidewall and wherein in the storage position the support means is arranged adjacent a mid height of the sidewall.

4. The arrangement according to claim 1 wherein the distance of movement of said support means from said operating position to said storage position is at least equal to the distance from said support member in said operating position to said feed end whereby in the storage position the feed end of the auger is withdrawn so as not to project beyond the rear edge of the sidewall.

5. The arrangement according to claim 1 wherein the mounting means comprises a bracket for attachment to the sidewall and an arm pivotally mounted on said bracket such that said arm can pivot about an axis lying in the plane parallel to the sidewall, said swivel means being mounted on an end of said arm remote from said bracket.

6. The arrangement according to claim 5 wherein the bracket is arranged such that in use the pivot axis thereof is inclined to the vertical whereby the arm moves upwardly and rearwardly from said storage position to said operating position.

7. The arrangement according to claim 5 wherein the swivel means comprises a first pin mounted on said arm at right angles thereto and substantially parallel to said bracket axis, a sleeve mounted on said first pin, a second pin carried by said sleeve at right angles thereto and a second sleeve rotatably mounted on said second pin and supporting said attachment means.

8. The arrangement according to claim 5 wherein the arm is asymmetrical about an axis longitudinal thereof such that it can be removed and inverted whereby to adjust the height of the operating position of the support means.

9. The arrangement according to claim 1 wherein the coupling means comprises a body on one of said flight and drive motor and a recess on the other of said flight and drive motor, said body being polygonal in transverse transaction for engaging and rotating a cooperating shape in said recess, said body being tapered longitudinally above and below a portion of maximum dimension whereby said body can be inserted into said recess while improperly aligned therewith.

* * * * *